Figure 1:
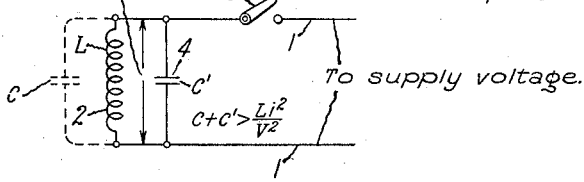

March 28, 1939.  L. F. BLUME ET AL  2,152,463

ELECTRIC CIRCUIT

Original Filed Dec. 30, 1937

Inventors:
Louis F. Blume,
Loyal V. Bewley,
by Harry E. Dunham
Their Attorney.

Patented Mar. 28, 1939

2,152,463

UNITED STATES PATENT OFFICE 2,152,463

ELECTRIC CIRCUIT

Louis F. Blume and Loyal V. Bewley, Pittsfield, Mass., assignors to General Electric Company, a corporation of New York Original application December 30, 1937, Serial No. 182,640. Divided and this application June 15, 1938, Serial No. 213,880

6 Claims. (Cl. 171—97)

This invention relates to electric circuits and more particularly to the protection of electric circuits containing inductance against insulation damaging high voltages caused by switching.

This is a division of our application for Electric circuit, Serial No. 182,640, filed December 30, 1937, and assigned to the assignee of the present application.

While this invention is primarily concerned with alternating current circuits in which medium sized currents are interrupted, it is not necessarily limited to such circuits and is applicable quite generally to circuits in which currents of all sizes, both direct currents and alternating currents, are interrupted.

The generally accepted theory of alternating current switching is that the current, as distinguished from the metallic conducting path carrying it, is not interrupted until a normal current zero point is reached. On this assumption it can be shown theoretically that the recovery voltage of the circuit, that is to say the voltage across the switch contacts after current interruption, can never exceed twice the normal peak voltage of the circuit. However, there have been a growing number of instances in which insulation flash-overs have occurred during switching which could only have been caused by voltages many more than twice the normal peak voltage of the circuit. For example, a number of preventive reactors used in changing taps under load (for regulating purposes) on power transformers and regulating transformers have had their insulation broken down during an ordinary tap-changing operation.

Upon investigation with a very fast three-element cathode ray oscillograph, it was found that the alternating current passing through a switch which is opening not infrequently actually ruptures at a definite value of current and at a time or angle considerably ahead of the time or angle corresponding to a normal current zero. Probably the reason that this fact has not generally been recognized sooner is that most previous switching studies were made in connection with larger currents, such as short circuit currents of the order of thousands and tens of thousands of amperes. When dealing with such very large currents the rupture of the current at a relatively small but definite value would be such a small fraction of the normal peak current during a cycle that the angle between the point where rupture actually takes place and normal current zero would be almost indistinguishable.

Current rupture by no means always occurs before current zero, and in fact, the rupture at current zero is the usual case. Furthermore, for any given switch the cut-off current, that is to say the current flowing at the instant of rupture, is not uniform. However, by recording the cut-off currents of any switch through a large number of successive operations thereof, a reasonably definite maximum cut-off current can be assigned to that particular switch.

When the current is abruptly cut off, all of the current flowing through the switch contacts at that instant is forced to flow through the natural capacitance of the windings and leads constituting the inductance in the circuit. This causes a relatively very high voltage to be produced. Thus, in tests, voltages as high as eighteen times normal have been recorded and voltages of six times normal are quite common.

As soon as the transient peak voltage caused by the charging of the natural capacitance of the circuit is reached, the process is reversed and the natural capacitance discharges through the inductance of the circuit. This interchange of energy between the inductance and natural capacitance of the circuit results in a damped oscillation at the natural frequency of the circuit. This frequency is inversely proportional to the square root of the inductance in henrys times the capacitance in farads.

In accordance with this invention, certain critical values of shunt capacitance have been discovered which make it possible to control and predict exactly the maximum value of the recovery voltage of the circuit and, thus, to limit this voltage to maximum values which the insulation of the circuit can safely withstand.

An object of this invention is to provide a new and improved electric circuit.

Another object of this invention is to provide capacitive means so correlated to the constants of a circuit that when properly connected thereto it will limit the recovery voltage of the circuit to a predictable and readily controllable maximum value.

This invention will be better understood from the following description taken in connection with the accompanying drawing and its scope will be pointed out in the appended claims.

Figure 2:
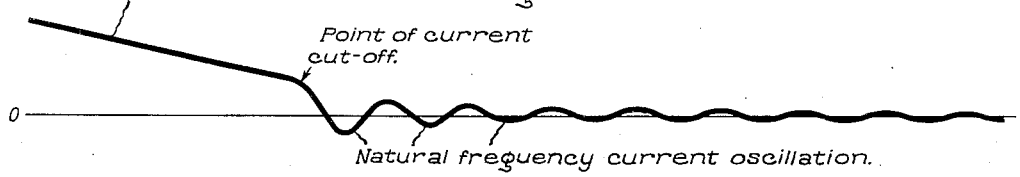
Figure 3:
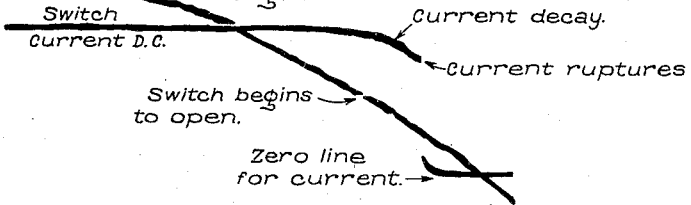
Figure 4:
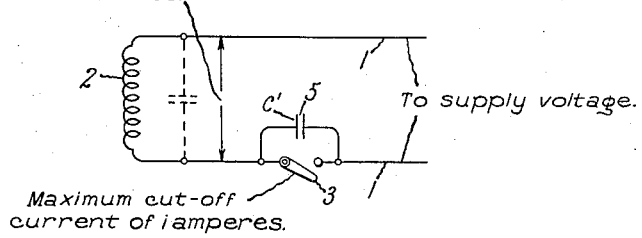

In the drawing, Fig. 1 is a diagrammatic showing of an embodiment of the invention using a capacitor in shunt with the inductive portion of a circuit for supplementing the natural capacitance of this portion of the circuit so as to limit the switching voltage, Fig. 2 is an oscillogram of an instantaneous cut-off by a switch of a sixty cycle per second alternating current before normal current zero is reached, Fig. 3 is an oscillogram showing the relation between direct current interruption and switch travel, Fig. 4 is an elementary diagram showing a modification of the invention using a switch shunting capacitor.

Referring now to the drawing and more particularly to Fig. 1, there is shown therein an electric circuit I connected to be energized by any suitable source of supply voltage (not shown). Connected in circuit I is an inductance 2, which may be a load or may be considered to be the natural or distributed inductance of the circuit. The current in the circuit is arranged to be interrupted by any suitable circuit maker and breaker 3. For limiting the circuit voltage a capacitor 4 is connected in shunt circuit relation with the inductance 2. The value C' of capacitor 4 is such that when it is combined with the natural capacitance of the circuit the voltage produced by an abrupt cut-off of the circuit current by the switch 3 will not exceed the transient insulation level of the circuit.

If switch 3 is closed long enough to establish steady state conditions and is then opened, an arc will normally be drawn and as previously explained it not infrequently happens that this arc will be extinguished and the current will be cut off instantaneously at a definite value considerably before the normal zero current point is reached. The current in the circuit will then start to oscillate at the natural frequency of the circuit, which in typical circuits will be 100 times as high as a normal commercial applied frequency of 60 cycles per second. This is illustrated by Fig. 2. This high frequency oscillation produces abnormally high voltage and, as mentioned above, these voltages have been known to flash over the circuit insulation.

In limiting the maximum voltage occurring as a result of abrupt current cut-off by deliberately connecting a capacitor in shunt with the circuit or with the inductive element causing the high transient voltage we have found that the maximum voltage is inversely proportional to the square root of the shunt capacitance and that therefore by adding capacitance in shunt with the inductive element of the circuit, the peak transient voltage as a result of abrupt current cut-off may be reduced to any value desired. Furthermore, the exact maximum value of the voltage $e$ can be determined from the formula $$e = i\sqrt{\frac{L}{C}}$$

This formula may be derived as follows. By test or calculation the maximum transient voltage, for instance the impulse voltage which the insulation of the circuit will withstand can be obtained. An impulse voltage is a voltage with a steep wave front in which the time taken for the voltage to reach its crest value from its zero value is very much less than the time required to reach one-half crest value after the crest has been passed. Thus, a typical transient for testing purposes requires one and one-half micro-seconds to reach its crest value from its zero value and requires about 40 micro-seconds to die down again to half the crest value. We will call the maximum impulse voltage which the circuit insulation will withstand the transient insulation level of the circuit and will assign to it the symbol V.

As previously explained every switch will have a maximum current cut-off value associated therewith. This value can be determined readily by making repeated measurements of the current cut-off as the switch is successively opened. In the load ratio control transformer contactors with which we made the test, the maximum cut-off current observed was about 5 amperes at about 10 degrees from a normal current zero. We will assign to this maximum cut-off current the symbol $i$.

Let L be the inductance in henrys of the reactor 2, R the resistance in series with it, that is to say its own resistance and the resistance of its leads, etc., C the effective or natural circuit capacitance including the series and shunt capacitance of the winding L, leads, etc., and G the leakage conductance of the circuit containing the winding L. If now it is assumed that there is an equal but opposite current through the switch contacts at the instant of rupture, it is obvious that this superposed current will cancel the steady state current through the contacts of the switch and since there was no voltage across the switch (the contacts being closed) associated with a steady state current, the "recovery voltage" must be due entirely to the superposed current. If now we assume the current to rupture at an angle $\theta$ prior to a current zero, the superposed current is, in operational form:

$$i = I \sin(\omega t - \theta) = I \frac{p\omega \cos\theta - p^2 \sin\theta}{p^2 + \omega^2} \quad (1)$$

The operational impedance of the circuit, as viewed from the breaker contacts, is $$Z(p) = \frac{R + pL}{LCp^2 + (LG + RC)p + (RG + 1)} \quad (2)$$

The operational equation for the recovery voltage then is $$e = Z(p) \cdot i = \frac{I}{C} \frac{p(p+b)(\omega\cos\theta - p\sin\theta)}{(p^2+\omega^2)(p^2+2ap+A^2)} \quad (3)$$

in which $$a = \frac{1}{2}\left(\frac{G}{C} + \frac{R}{L}\right), \quad b = \frac{R}{L}, \quad A^2 = \frac{RG+1}{LC} \quad (4)$$

The solution of (3) is easily effected by the expansion theorem, and is $$e = \frac{\omega I}{Cw^2}\left\{\sqrt{\frac{(1+b^2/\omega^2)}{(1+a^2/w^2-\omega^2/w^2)^2+4a^2\omega^2/w^4}}\sin(\omega t - \theta + \phi_1 - \phi_2) + \sqrt{\frac{\left[1+\left(\frac{b-a}{w}\right)^2\right]\left[\left(\cos\theta + \frac{a}{\omega}\sin\theta\right)^2 + \left(\frac{w}{\omega}\sin\theta\right)^2\right]}{(1-a^2/w^2-\omega^2/w^2)^2+4a^2/w^2}} \times \epsilon^{-at}\sin(wt + \phi_3 - \phi_4 - \phi_5)\right\} \quad (5)$$

where:

$$w^2 = A^2 - a^2$$

$$\phi_1 = \tan^{-1}(\omega/b)$$

$$\phi_2 = \tan^{-1}\left(\frac{2a\omega}{a^2 - \omega^2 + w^2}\right)$$

$$\phi_3 = \tan^{-1}\left(\frac{w}{b-a}\right)$$

$$\phi_4 = \tan^{-1}\left(\frac{w\sin\theta}{\omega\cos\theta + a\sin\theta}\right)$$

$$\phi_5 = \tan^{-1}\left(\frac{2aw}{a^2 + \omega^2 - w^2}\right)$$

If, as would normally be the case, $w$ is large compared with $a$, $b$, and $\omega$, and $\omega$ is large compared to $b$, there is approximately $$\phi_1 \cong 90°, \phi_2 \cong 90°, \phi_3 \cong 0, \phi_5 \cong 180°, w^2 \cong \frac{1}{LC} \quad (5)$$

and becomes $$e \cong E \left\{ \cos(\omega t - \theta) - \sqrt{\left(\cos\theta + \frac{a}{\omega}\sin\theta\right)^2 + \left(\frac{w}{\omega}\sin\theta\right)^2} \times \epsilon^{-at} \cos(wt - \phi_4) \right\} \quad (6)$$

where $$E = \sqrt{R^2 + \omega^2 L^2} \quad I = \text{normal voltage}$$

Unless a shunt resistor has been added, G will be so small that the approximation (6) holds, and it may be expanded into the form $$e = E \left\{ \cos(\omega t - \theta) - \left(\cos\theta + \frac{a}{\omega}\sin\theta\right) \epsilon^{-at} \cos wt - \left(\frac{w}{\omega}\sin\theta\right) \epsilon^{-at} \sin wt \right\} \quad (7)$$

and the last term is responsible for the very high voltages experienced. It is $$E \frac{w}{\omega} \sin\theta = E \left(\frac{\text{natural frequency}}{\text{applied frequency}}\right)\left(\frac{\text{cut-off current}}{\text{normal crest current}}\right) \quad (8)$$

Now, if the normal crest current is considered to be $$\frac{E}{\omega L}$$

which is a justifiable assumption in view of the facts that the series resistance is very small compared with the series reactance in most circuits of this type and these two impedance components combine vectorially instead of arithmetically, Equation 8 may be rewritten thus:

$$e = \frac{\left(E \cdot \frac{1}{\sqrt{LC}}\right)(i)}{\omega \cdot \frac{E}{\omega L}} \quad (9)$$

By cancelling similar terms in both numerator and denominator and simplifying, this reduces to $$\frac{L \times i}{\sqrt{LC}}$$

which further reduces to $$e = \sqrt{\frac{L}{C}} \times (\text{cut-off current}) \quad (10)$$

If $e$ is assigned the value of V and if L and the cut-off current are known, the correct value of C which will limit the maximum voltage to the transient insulation level of the circuit can easily be obtained from Equation (10). It is $$C' = \text{or} > \frac{Li^2}{V^2} - C \quad (11)$$

In Fig. 4, the protective capacitor C' is connected across the switch instead of across the inductance.

While we have shown and described particular embodiments of this invention, it will be obvious to those skilled in the art that changes and modifications can be made therein without departing from the invention and therefore it is aimed in the appended claims to cover all such changes or modifications as fall within the true spirit and scope of the invention.

What we claim as new and desire to secure by Letters Patent of the United States is:

1. An electric circuit containing, in combination, a source of current, an element having an inductance of L henrys connected to carry current supplied by said source, a current interrupting element connected in circuit with said inductive element, said current interrupting element having a maximum cut-off current of $i$ amperes, said circuit having a transient insulation level of V volts, and a protective capacitor effectively connected in shunt with one of said elements, said capacitor having a value of C farads such that $$i \times \sqrt{\frac{L}{C}}$$

is less than V.

2. An electric circuit containing, in combination, a source of current, an inductive element of L henrys connected to carry current supplied by said source, a current interrupting element connected in circuit with said inductive element, said circuit having a transient insulation level of V volts, said current interrupting element having a maximum cut-off current of $i$ amperes, and a capacitor connected in shunt with said inductive element, said capacitor having a value of C farads such that it is of the order of magnitude of, but greater than, $$\frac{Li^2}{V^2}$$

3. An electric circuit adapted to be connected to a source of current and containing, in combination, an inductance of L henrys connected to carry current supplied by said source, said inductance having a natural capacitance of C farads, a current interrupting element connected in circuit with said inductance, said current interrupting element having a maximum cut-off current of $i$ amperes, said circuit having a transient insulation level of V volts, and a protective capacitor effectively connected in shunt with one of said elements, said capacitor having a value of C' farads such that $$i \times \sqrt{\frac{L}{C+C'}}$$

is less than V.

4. An electric circuit adapted to be connected to a source of current and containing, in combination, an inductance of L henrys connected to carry current supplied by said source, said inductance having a natural capacitance of C farads, a current interrupting element connected in circuit with said inductance, said current interrupting element having a maximum cut-off current of $i$ amperes, said circuit having a transient insulation level of V volts, and a protective capacitor effectively connected in shunt with one of said elements, said capacitor having a value of C' farads such that $$i \times \sqrt{\frac{L}{C+C'}}$$

is of the order of magnitude of, but less than, V.

5. An electric circuit adapted to be connected to a source of current and containing, in combination, an inductive element of L henrys connected to carry a current supplied by said source, said inductive element having a natural capacitance of C farads, a current interrupting element connected in circuit with said inductive element, said circuit having a transient insulation element of V volts, said current interrupting element having a maximum cut-off current of $i$ amperes, and a capacitor connected in shunt with said inductive element, said capacitor having an inductive value of C' farads such that $C-C'$ is of the order of magnitude of, but greater than, $$\frac{Li^2}{V^2}$$

6. An electric circuit adapted to be connected to a source of current and containing, in combination, an inductive element of L henrys connected to carry a current supplied by said source, said inductive element having a natural capacitance of C farads, a current interrupting element connected in circuit with said inductance element, said circuit having a transient insulation element of V volts, said current interrupting element having a maximum cut-off current of $i$ amperes, and a capacitor connected in shunt with said inductive element, said capacitor having an inductive value of C' farads such that $C+C'$ is greater than $$\frac{Li^2}{V^2}$$

LOUIS F. BLUME.
LOYAL V. BEWLEY.